(12) United States Patent
Facchini et al.

(10) Patent No.: US 12,078,075 B2
(45) Date of Patent: Sep. 3, 2024

(54) TURBOMACHINES AND EPICYCLIC GEAR ASSEMBLIES WITH AXIALLY OFFSET SUN AND RING GEARS

(71) Applicant: GE Avio S.r.l., Rivalta di Torino (IT)

(72) Inventors: Marco Facchini, Rivalta di Torino (IT); Gianluca Andrei, Rivalta di Torino (IT); Paolo Altamura, Brindisi (IT)

(73) Assignee: GE Avio S.r.l. (IT)

( * ) Notice: Subject to any disclaimer, the term of this patent is extended or adjusted under 35 U.S.C. 154(b) by 0 days.

(21) Appl. No.: 18/091,753

(22) Filed: Dec. 30, 2022

(65) Prior Publication Data
US 2023/0142971 A1 May 11, 2023

Related U.S. Application Data

(62) Division of application No. 17/307,948, filed on May 4, 2021, now Pat. No. 11,542,829.

(30) Foreign Application Priority Data

May 6, 2020 (IT) .................. 102020000010123

(51) Int. Cl.
*F02C 7/36* (2006.01)
*F01D 5/02* (2006.01)
(Continued)

(52) U.S. Cl.
CPC ............. *F01D 25/00* (2013.01); *F01D 5/022* (2013.01); *F02C 7/36* (2013.01); *F16H 1/2809* (2013.01);
(Continued)

(58) Field of Classification Search
CPC .. F16H 2001/2881; F16H 1/2809; F16H 1/46; F16H 3/44; F16H 57/08; F02C 7/36; F05D 2260/40311
See application file for complete search history.

(56) References Cited

U.S. PATENT DOCUMENTS 2,591,743 A 4/1952 Thompson
3,188,888 A 6/1965 Heinrich et al.
(Continued)

FOREIGN PATENT DOCUMENTS

CA 2 915 602 C 4/2018
CN 101737460 A 6/2010
(Continued)

OTHER PUBLICATIONS

Office Action, dated Dec. 18, 2020, issued for Italian Patent Application No. 102020000010123, 8 pages.

*Primary Examiner* — Sherry L Estremsky
(74) *Attorney, Agent, or Firm* — Klarquist Sparkman, LLP

(57) ABSTRACT

A turbomachine engine includes a fan assembly and a core engine comprising a turbine and an input shaft rotatable with the turbine is provided. A single-stage epicyclic gear assembly receives the input shaft at a first speed and drives an output shaft coupled to the fan assembly at a second speed. A sun gear rotates about a longitudinal centerline of the gear assembly and has a sun gear-mesh region along the longitudinal centerline of the gear assembly where the sun gear is configured to contact a plurality of planet gears. A ring gear-mesh region is provided along the longitudinal centerline of the gear assembly where a ring gear is configured to contact the plurality of planet gears. The sun gear-mesh region is axially offset from the ring gear-mesh region along the longitudinal centerline.

20 Claims, 12 Drawing Sheets

(51) Int. Cl.
    *F01D 25/00*  (2006.01)
    *F16H 1/28*   (2006.01)
    *F16H 1/32*   (2006.01)
    *F16H 1/46*   (2006.01)
    *F16H 3/44*   (2006.01)
    *F16H 57/08*  (2006.01)

(52) U.S. Cl.
    CPC ............... *F16H 1/32* (2013.01); *F16H 1/46* (2013.01); *F16H 3/44* (2013.01); *F16H 57/08* (2013.01); *F05D 2260/40311* (2013.01); *F16H 2001/289* (2013.01)

(56) References Cited

U.S. PATENT DOCUMENTS

| | | | | |
|---|---|---|---|---|
| 3,245,279 | A * | 4/1966 | Baker | F16H 1/28 |
| | | | | 475/331 |
| 3,258,995 | A * | 7/1966 | Bennett | F16H 57/02004 |
| | | | | 475/342 |
| 3,754,484 | A | 8/1973 | Grigson | |
| 9,989,122 | B2 | 6/2018 | Venter et al. | |
| 10,072,571 | B2 | 9/2018 | Zimmitti et al. | |
| 10,094,278 | B2 | 10/2018 | Sheridan et al. | |
| 11,339,725 | B2 * | 5/2022 | Simon | F16H 1/28 |
| 11,542,829 | B2 * | 1/2023 | Facchini | F16H 57/08 |
| 2003/0232694 | A1 | 12/2003 | Buhrke | |
| 2010/0035719 | A1 | 2/2010 | Wang | |
| 2013/0029802 | A1 | 1/2013 | Fox | |
| 2013/0091708 | A1 | 4/2013 | Paelicke et al. | |
| 2013/0192264 | A1 | 8/2013 | McCune et al. | |
| 2013/0255438 | A1 | 10/2013 | Kieninger | |
| 2014/0227084 | A1 | 8/2014 | Sheridan | |
| 2014/0243142 | A1 | 8/2014 | Toikkanen et al. | |
| 2016/0201794 | A1 | 7/2016 | Gravina | |
| 2017/0356534 | A1 | 12/2017 | Richter et al. | |
| 2017/0369179 | A1 | 12/2017 | Bradbrook | |
| 2018/0080411 | A1 * | 3/2018 | Miller | F02C 3/107 |
| 2018/0230902 | A1 | 8/2018 | Desjardins | |
| 2019/0078975 | A1 | 3/2019 | Sibbach | |
| 2019/0234510 | A1 * | 8/2019 | Brillon | F16H 1/2809 |
| 2019/0360356 | A1 | 11/2019 | Savaria et al. | |
| 2021/0108572 | A1 * | 4/2021 | Khalid | F01D 7/00 |
| 2021/0388770 | A1 | 12/2021 | Hrubec et al. | |

FOREIGN PATENT DOCUMENTS

| | | |
|---|---|---|
| DE | 102018204303 A1 | 9/2019 |
| EP | 1 113 193 A2 | 7/2001 |
| EP | 2 559 914 A1 | 2/2013 |
| EP | 3 567 284 B1 | 4/2021 |
| FR | 3035153 A1 | 10/2016 |
| GB | 917855 A | 5/1959 |
| GB | 1350431 A | 4/1974 |

* cited by examiner

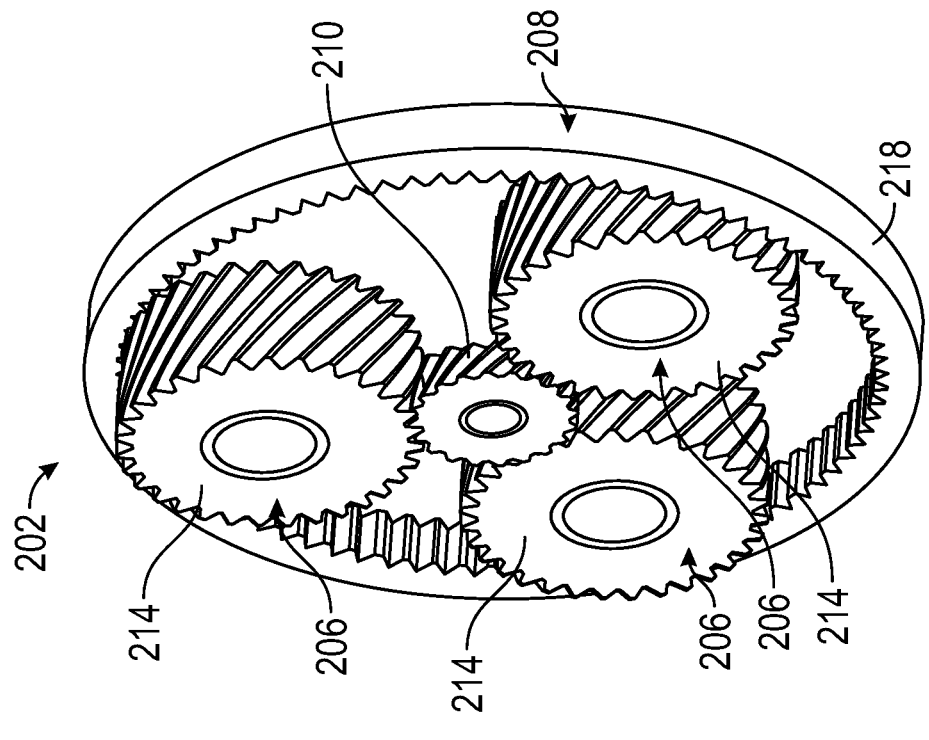
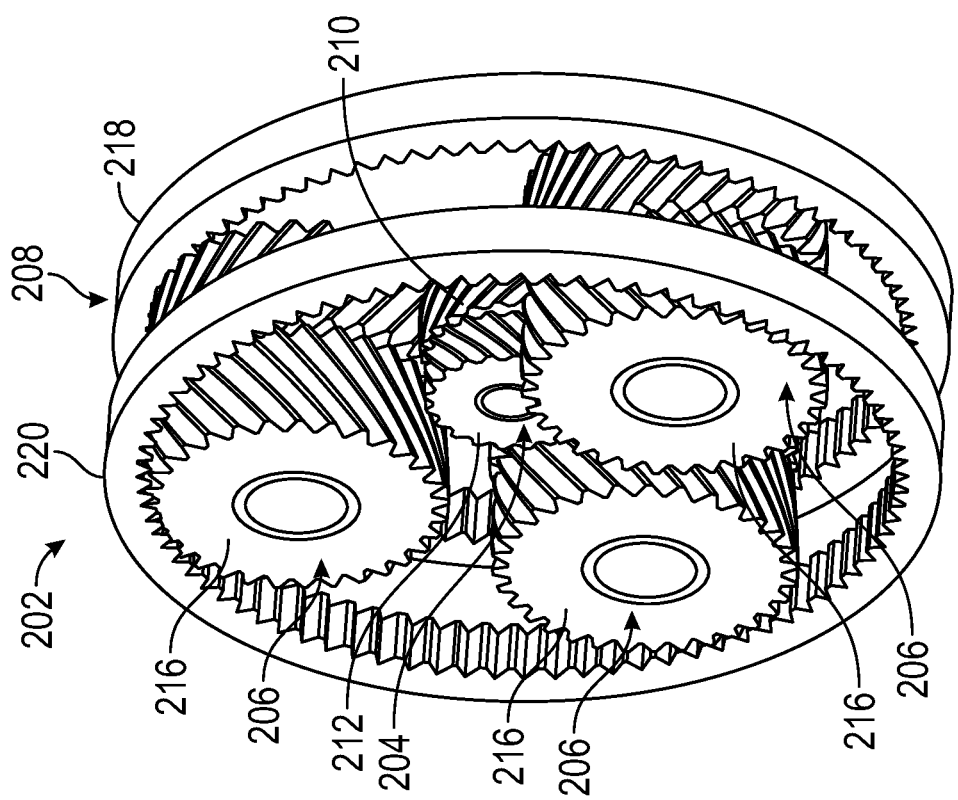
FIG. 6B
FIG. 6A

US 12,078,075 B2

TURBOMACHINES AND EPICYCLIC GEAR ASSEMBLIES WITH AXIALLY OFFSET SUN AND RING GEARS

CROSS REFERENCE TO RELATED APPLICATIONS

This application is a divisional of U.S. patent application Ser. No. 17/307,948, filed May 4, 2021, now U.S. Pat. No. 11,542,829, which claims the benefit of Italian Patent Application No. 102020000010123, filed May 6, 2020. The prior applications are incorporated herein by reference in their entirety.

ACKNOWLEDGMENT OF GOVERNMENT SUPPORT

The project leading to this application has received funding from the Clean Sky 2 Joint Undertaking (JU) under grant agreement No 945541. The JU receives support from the European Union's Horizon 2020 research and innovation programme and the Clean Sky 2 JU members other than the Union.

FIELD

The present subject matter relates generally to turbomachines including gear assemblies and, in particular, to gear assembly arrangements particular to certain turbomachine configurations.

BACKGROUND

A turbofan engine operates on the principle that a central gas turbine core drives a bypass fan, the bypass fan being located at a radial location between a nacelle of the engine and the engine core. With such a configuration, the engine is generally limited in a permissible size of the bypass fan, as increasing a size of the fan correspondingly increases a size and weight of the nacelle.

An open rotor engine, by contrast, operates on the principle of having the bypass fan located outside of the engine nacelle. This permits the use of larger rotor blades able to act upon a larger volume of air than a traditional turbofan engine, potentially improving propulsive efficiency over conventional turbofan engine designs.

Engine designs for turbomachines, including turbofans and open rotor engines, may require large gear ratios between the low speed spool and the fan rotor to permit the larger rotor blades to act upon a larger volume of air and/or to do so at certain desired operating speeds of the engine or aircraft. One challenge is that known gear assemblies may provide inadequate gear ratios for desired operations. For example, known gear assemblies may inadequately reduce the output rotational speed relative to the input rotational speed, such that the fan rotor operates too fast and inefficient and/or the turbine operates too slow and inefficient.

As such, there is a need for gear assemblies that provide desired gear ratios as may be suitable for certain turbomachine configurations.

SUMMARY

Aspects and advantages of the invention will be set forth in part in the following description, or may be obvious from the description, or may be learned through practice of the technology disclosed in the description.

Various turbomachine engines and gear assemblies are disclosed herein. In some embodiments, a turbomachine engine that includes a fan assembly and a core engine comprising a turbine and an input shaft rotatable with the turbine is provided. A single-stage epicyclic gear assembly receives the input shaft at a first speed and drives an output shaft coupled to the fan assembly at a second speed, the second speed being slower than the first speed. The gear assembly comprises a sun gear, a plurality of planet gears, and a ring gear. The sun gear rotates about a longitudinal centerline of the gear assembly and has a sun gear-mesh region along the longitudinal centerline of the gear assembly where the sun gear is configured to contact the plurality of planet gears. A ring gear-mesh region is provided along the longitudinal centerline of the gear assembly where the ring gear is configured to contact the plurality of planet gears. The sun gear-mesh region is axially offset from the ring gear-mesh region along the longitudinal centerline.

These and other features, aspects and advantages of the present disclosure will become better understood with reference to the following description and appended claims. The accompanying drawings, which are incorporated in and constitute a part of this specification, illustrate embodiments of the disclosed technology and, together with the description, serve to explain the principles of the disclosure.

BRIEF DESCRIPTION OF THE DRAWINGS

A full and enabling disclosure of the present invention directed to one of ordinary skill in the art, is set forth in the specification, which makes reference to the appended figures, in which:

FIGS. 6A and 6B are a schematic illustration of a gear assembly with three planet gears;

DETAILED DESCRIPTION

Figure 1:
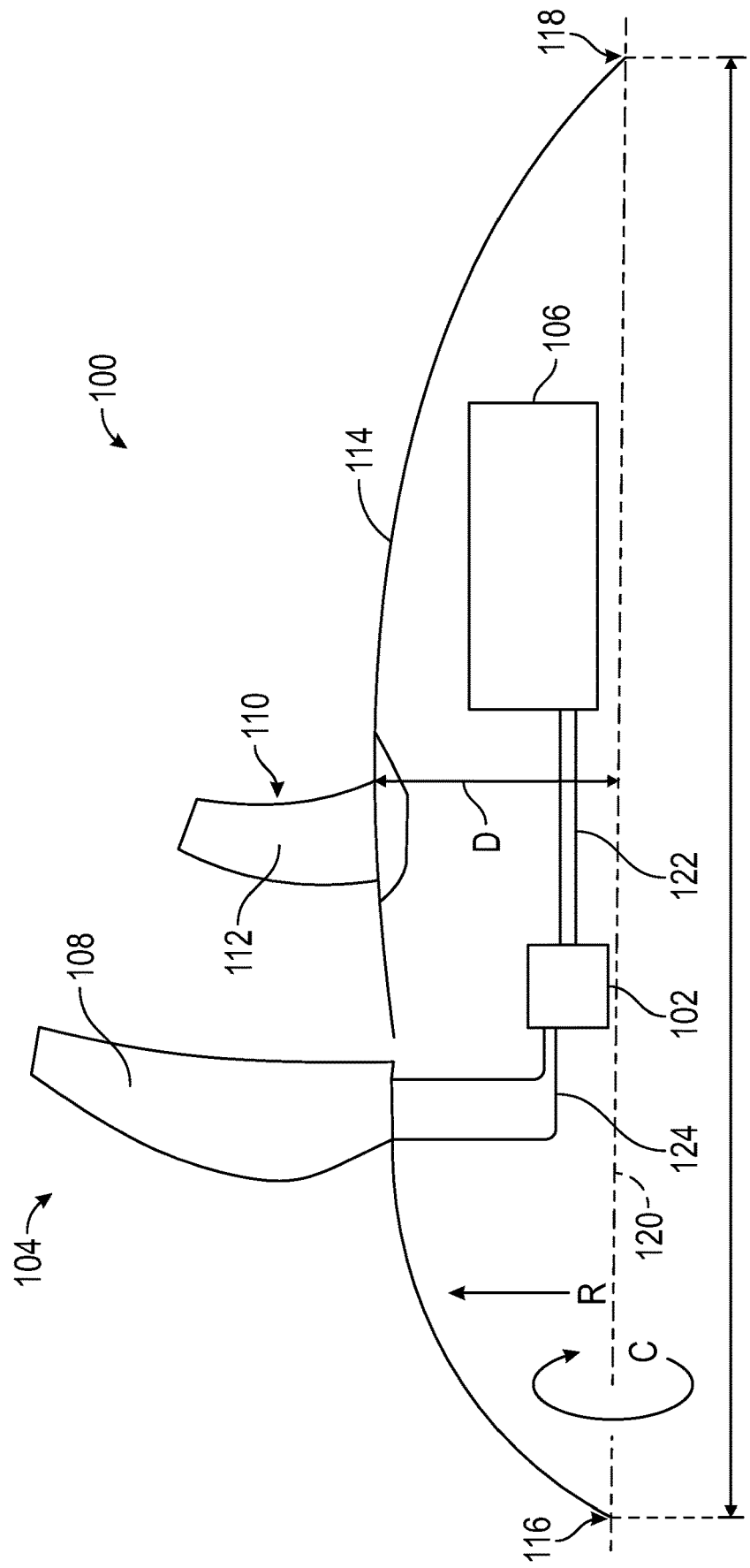
FIG. 1 is a cross-sectional schematic illustration of an exemplary embodiment of an open rotor propulsion system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine or gear assembly described hereinbelow may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein enable the manufacture of heat exchangers having unique features, configurations, thicknesses, materials, densities, fluid passageways, headers, and mounting structures that may not have been possible or practical using prior manufacturing methods. Some of these features are described herein.

Referring now to the drawings, FIG. 1 is an exemplary embodiment of an engine 100 including a gear assembly 102 according to aspects of the present disclosure. The engine 100 includes a fan assembly 104 driven by a core engine 106. In various embodiments, the core engine 106 is a Brayton cycle system configured to drive the fan assembly 104. The core engine 106 is shrouded, at least in part, by an outer casing 114. The fan assembly 104 includes a plurality of fan blades 108. A vane assembly 110 is extended from the outer casing 114. The vane assembly 110 including a plurality of vanes 112 is positioned in operable arrangement with the fan blades 108 to provide thrust, control thrust vector, abate or re-direct undesired acoustic noise, and/or otherwise desirably alter a flow of air relative to the fan blades 108. In some embodiments, the fan assembly 104 includes between three (3) and twenty (20) fan blades 108. In particular embodiments, the fan assembly 104 includes between ten (10) and sixteen (16) fan blades 108. In certain embodiments, the fan assembly 104 includes twelve (12) fan blades 108. In certain embodiments, the vane assembly 110 includes an equal or fewer quantity of vanes 112 to fan blades 108.

In some embodiments, the fan blade tip speed at a cruise flight condition can be 650 to 900 fps, or 700 to 800 fps. A fan pressure ratio (FPR) for the fan assembly 104 can be 1.04 to 1.10, or in some embodiments 1.05 to 1.08, as measured across the fan blades at a cruise flight condition.

In certain embodiments, such as depicted in FIG. 1, the vane assembly 110 is positioned downstream or aft of the fan assembly 104. However, it should be appreciated that in some embodiments, the vane assembly 110 may be positioned upstream or forward of the fan assembly 104. In still various embodiments, the engine 100 may include a first vane assembly positioned forward of the fan assembly 104 and a second vane assembly positioned aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

In certain embodiments, such as depicted in FIG. 1, the engine 100 is an un-ducted thrust producing system, such that the plurality of fan blades 108 is unshrouded by a nacelle or fan casing. As such, in various embodiments, the engine 100 may be configured as an unshrouded turbofan engine, an open rotor engine, or a propfan engine. In particular embodiments, the engine 100 is a single unducted rotor engine including a single row of fan blades 108. The engine 100 configured as an open rotor engine includes the fan assembly 104 having large-diameter fan blades 108, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft. and approximately 45,000 ft. In still certain embodiments, cruise altitude is expressed in flight levels (FL) based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

The core engine 106 is generally encased in outer casing 114 defining a maximum diameter. In certain embodiments, the engine 100 includes a length from a longitudinally forward end 116 to a longitudinally aft end 118. In various embodiments, the engine 100 defines a ratio of length (L) to maximum diameter ($D_{max}$) that provides for reduced installed drag. In one embodiment, $L/D_{max}$ is at least 2. In another embodiment, $L/D_{max}$ is at least 2.5. In some embodiments, the $L/D_{max}$ is less than 5, less than 4, and less than 3. In various embodiments, it should be appreciated that the $L/D_{max}$, is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the $L/D_{max}$, the fan assembly 104, and/or the vane assembly 110 separately or together configure, at least in part, the engine 100 to operate at a maximum cruise altitude operating speed between approximately Mach 0.55 and approximately Mach 0.85.

Referring again to FIG. 1, the core engine 106 extends in a radial direction R relative to an engine axis centerline 120. The gear assembly 102 receives power or torque from the core engine 106 through a power input source 122 and provides power or torque to drive the fan assembly 104, in a circumferential direction C about the engine axis centerline 120, through a power output source 124.

Figure 2:
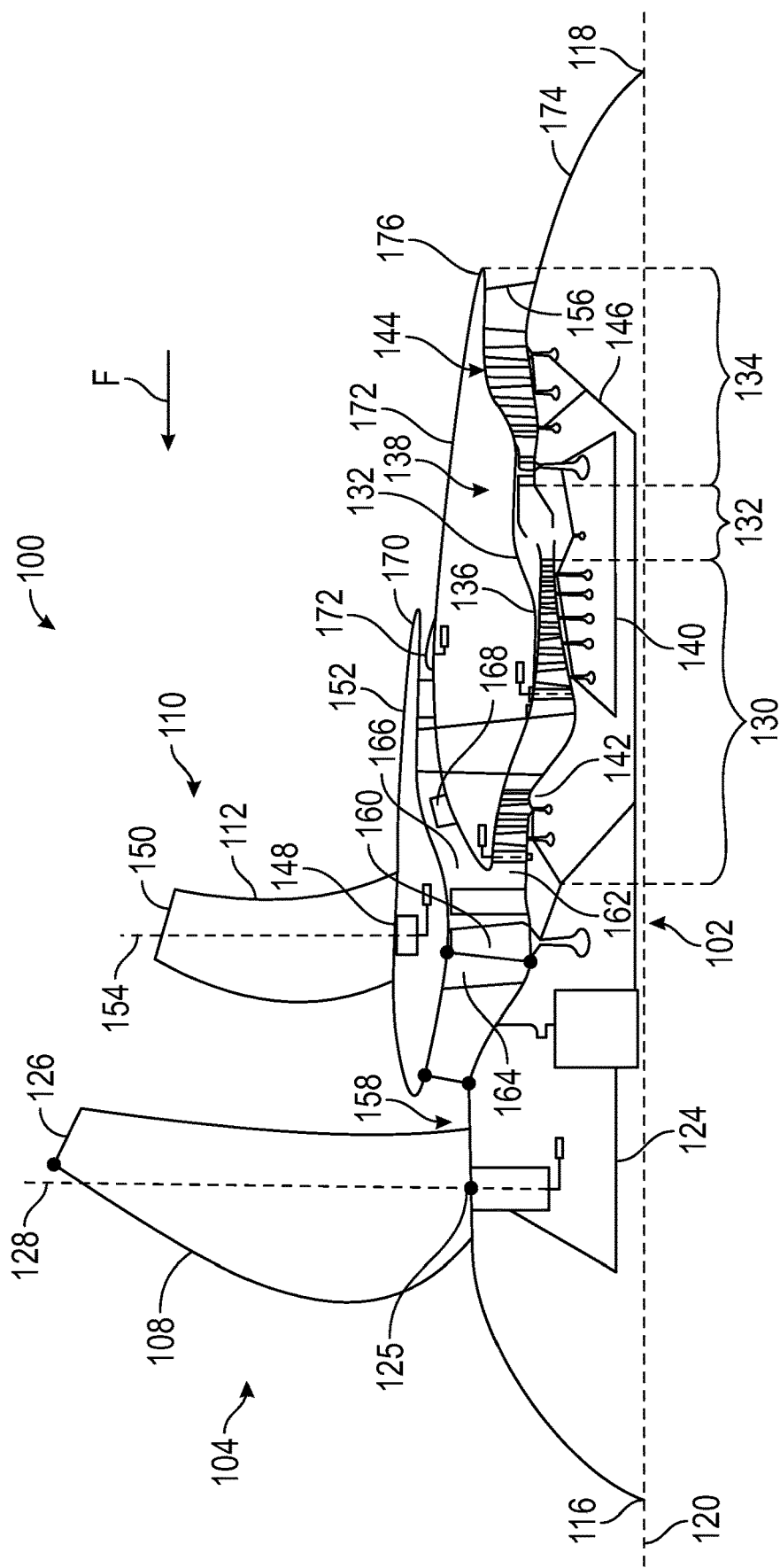
FIG. 2 is a cross-sectional schematic illustration of an exemplary embodiment of an open rotor propulsion system.

FIG. 2 shows an elevational cross-sectional view of an exemplary embodiment of an open rotor propulsion engine 100. The engine 100 has a fan assembly 104 that includes a plurality of fan blades 108 around central longitudinal axis 120 of the engine 100. Fan blades 108 are circumferentially arranged in an equally spaced relation around the centerline 120, and each fan blade 108 has a root 125 and a tip 126, and an axial span defined therebetween, as well as a central blade axis 128.

The core engine 16 includes a compressor section 130, a heat addition system 132 (e.g., combustor), and an expansion section 134 together in serial flow arrangement. The core engine 106 extends circumferentially relative to an engine centerline axis 120. The core engine 106 includes a high-speed spool that includes a high-speed compressor 136 and a high-speed turbine 138 operably rotatably coupled together by a high-speed shaft 140. The heat addition system 132 is positioned between the high-speed compressor 136 and the high-speed turbine 138. Various embodiments of the heat addition system 132 include a combustion section. The combustion section may be configured as a deflagrative combustion section, a rotating detonation combustion section, a pulse detonation combustion section, or other appropriate heat addition system. The heat addition system 132 may be configured as one or more of a rich-burn system or a lean-burn system, or combinations thereof. In still various embodiments, the heat addition system 132 includes an annular combustor, a can combustor, a cannular combustor, a trapped vortex combustor (TVC), or other appropriate combustion system, or combinations thereof.

The core engine 106 also includes a booster or low-speed compressor positioned in flow relationship with the high-speed compressor 136. The low-speed compressor 142 is rotatably coupled with the low-speed turbine 144 via a low-speed shaft 146 to enable the low-speed turbine 144 to drive the low-speed compressor 142. The low-speed shaft 146 is also operably connected to gear assembly 102 to provide power to the fan assembly 104, such as described further herein.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low-speed turbine" defines a component configured to operate at a rotational speed, such as a maximum allowable rotational speed, lower than a "high turbine" or "high-speed turbine" at the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

As discussed in more detail below, the core engine 106 includes the gear assembly 102 that is configured to transfer power from the expansion section 140 and reduce an output rotational speed at the fan assembly 104 relative to the low-speed turbine 144. Embodiments of the gear assembly 104 depicted and described herein can allow for gear ratios suitable for large-diameter unducted fans. Additionally, embodiments of the gear assembly 102 provided herein may be suitable within the radial or diametrical constraints of the core engine 106 within the outer casing 114.

Engine 100 also includes, in the exemplary embodiment of FIG. 2, a vane assembly 110 comprise a plurality of vanes 112 disposed around central axis 120. Each vane 112 has a root 148 and a tip 150, and a span defined therebetween. Vanes 112 can be arranged in a variety of manners. In some embodiments, for example, they are not all equidistant from the rotating assembly.

In some embodiments, vanes 112 are mounted to a stationary frame and do not rotate relative to the central axis 120, but may include a mechanism for adjusting their orientation relative to their axis 154 and/or relative to the blades 108. For reference purposes, FIG. 2 depicts a forward direction denoted with arrow F, which in turn defines the forward and aft portions of the system. As shown in FIGS. 1 and 2, the fan assembly 104 can be located forward of the gas core engine 106 in a "puller" configuration, with the exhaust 156 located aft of core engine 106.

Left- or right-handed engine configurations, useful for certain installations in reducing the impact of multi-engine torque upon an aircraft, can be achieved by mirroring the airfoils (e.g., 108, 112) such that the fan assembly 104 rotates clockwise for one propulsion system and counter-clockwise for the other propulsion system. Alternatively, an optional reversing gearbox can be provided to permits a common gas turbine core and low-pressure turbine to be used to rotate the fan blades either clockwise or counter-clockwise, i.e., to provide either left- or right-handed configurations, as desired, such as to provide a pair of oppositely-rotating engine assemblies can be provided for certain aircraft installations while eliminating the need to have internal engine parts designed for opposite rotation directions.

Engine 100 also includes a gear assembly 102 which includes a gear set for decreasing the rotational speed of the fan assembly 104 relative to the low speed (pressure) turbine 144. In operation, the rotating fan blades 108 are driven by the low speed (pressure) turbine 144 via gear assembly 102 such that the fan blades 108 rotate around the axis 120 and generate thrust to propel the engine 100, and hence an aircraft on which it is mounted, in the forward direction F.

It may be desirable that either or both of the fan blades 104 or the vanes 112 incorporate a pitch change mechanism such that the blades can be rotated with respect to an axis of pitch rotation (annotated as 128 or 154, respectively) either independently or in conjunction with one another. Such pitch change can be utilized to vary thrust and/or swirl effects under various operating conditions, including to provide a thrust reversing feature which may be useful in certain operating conditions such as upon landing an aircraft.

Vanes 112 can be sized, shaped, and configured to impart a counteracting swirl to the fluid so that in a downstream direction aft of both fan blades 104 and vanes 112 the fluid has a greatly reduced degree of swirl, which translates to an increased level of induced efficiency. Vanes 112 may have a shorter span than fan blades 104, as shown in FIGS. 1 and 2. For example, vanes 112 may have a span that is at least 50% of a span of fan blades 104. In some embodiments, the span of the vanes can be the same or longer than the span as fan blades 104, if desired. Vanes 112 may be attached to an aircraft structure associated with the engine 100, as shown in FIG. 1, or another aircraft structure such as a wing, pylon, or fuselage. Vanes 112 may be fewer or greater in number than, or the same in number as, the number of fan blades 104. In some embodiments, the number of vanes 112 are greater than two, or greater than four, in number. Fan blades 104 may be sized, shaped, and contoured with the desired blade loading in mind.

In the embodiment shown in FIG. 2, an annular 360-degree inlet 158 is located between the fan assembly 104 and the vane assembly 110, and provides a path for incoming atmospheric air to enter the engine core 106 radially inwardly of at least a portion of the vane assembly 110. Such a location may be advantageous for a variety of reasons, including management of icing performance as well as protecting the inlet 158 from various objects and materials as may be encountered in operation.

FIGS. 1 and 2 illustrate what may be termed a "puller" configuration where the fan assembly 104 is located forward of the engine core 106. Other configurations are possible and contemplated as within the scope of the present disclosure, such as what may be termed a "pusher" configuration embodiment where the engine core 106 is located forward of the fan assembly 104.

The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

In the exemplary embodiment of FIG. 2, in addition to the open rotor or unducted fan assembly 104 with its plurality of fan blades 104, an optional ducted fan 160 is included behind fan assembly 104, such that the engine 100 includes both a ducted and an unducted fan which both serve to generate thrust through the movement of air at atmospheric temperature without passage through the engine core 106. The ducted fan 160 is shown at about the same axial location as vane 112, and radially inward of the vane root 148. Alternatively, the ducted fan 160 may be between the vane 112 and core duct 162, or be farther forward of the vane 112. The ducted fan 160 may be driven by the low-pressure turbine, or by any other suitable source of rotation, and may serve as the first stage of booster 142 or may be operated separately. Air entering the inlet 158 flows through an inlet duct 164 and then is divided such that a portion flows through a core duct 162 and a portion flows through a fan duct 166. Fan duct 166 may incorporate heat exchangers 168, and exhausts to the atmosphere through an independent fixed or variable nozzle 170 aft of the vane assembly 110, at the aft end of the fan cowl 152 and outside of the engine core cowl 172. Air flowing through the fan duct 166 thus "bypasses" the core of the engine and does not pass through the core.

Thus, in the exemplary embodiment, engine 100 includes an unducted fan formed by the fan blades 108, followed by a ducted fan 160, which directs airflow into two concentric or non-concentric ducts 162 and 166, thereby forming a three-stream engine architecture with 3 paths for air which passes through the fan assembly 104.

In the exemplary embodiment shown in FIG. 2, a slidable, moveable, and/or translatable plug nozzle 172 with an actuator may be included in order to vary the exit area of the nozzle 170. A plug nozzle is typically an annular, symmetrical device which regulates the open area of an exit such as a fan stream or core stream by axial movement of the nozzle such that the gap between the nozzle surface and a stationary structure, such as adjacent walls of a duct, varies in a scheduled fashion thereby reducing or increasing a space for airflow through the duct. Other suitable nozzle designs may be employed as well, including those incorporating thrust reversing functionality. Such an adjustable, moveable nozzle may be designed to operate in concert with other systems such as VBV's, VSV's, or blade pitch mechanisms and may be designed with failure modes such as fully-open, fully-closed, or intermediate positions, so that the nozzle 170 has a consistent "home" position to which it returns in the event of any system failure, which may prevent commands from reaching the nozzle 170 and/or its actuator.

In some embodiments, a mixing device 174 can be included in a region aft of a core nozzle 176 to aid in mixing the fan stream and the core stream to improve acoustic performance by directing core stream outward and fan stream inward.

Since the engine 100 shown in FIG. 2 includes both an open rotor fan assembly 104 and a ducted fan assembly 160, the thrust output of both and the work split between them can be tailored to achieve specific thrust, fuel burn, thermal management, and/or acoustic signature objectives which may be superior to those of a typical ducted fan gas turbine propulsion assembly of comparable thrust class. The ducted fan assembly 160, by lessening the proportion of the thrust required to be provided by the unducted fan assembly 104, may permit a reduction in the overall fan diameter of the unducted fan assembly and thereby provide for installation flexibility and reduced weight.

Operationally, the engine 100 may include a control system that manages the loading of the respective open and ducted fans, as well as potentially the exit area of the variable fan nozzle, to provide different thrust, noise, cooling capacity and other performance characteristics for various portions of the flight envelope and various operational conditions associated with aircraft operation. For example, in climb mode the ducted fan may operate at maximum pressure ratio there-by maximizing the thrust capability of stream, while in cruise mode, the ducted fan may operate a lower pressure ratio, raising overall efficiency through reliance on thrust from the unducted fan. Nozzle actuation modulates the ducted fan operating line and overall engine fan pressure ratio independent of total engine airflow.

The ducted fan stream flowing through fan duct 166 may include one or more heat exchangers 168 for removing heat from various fluids used in engine operation (such as an air-cooled oil cooler (ACOC), cooled cooling air (CCA), etc.). The heat exchangers 168 may take advantage of the integration into the fan duct 166 with reduced performance penalties (such as fuel efficiency and thrust) compared with traditional ducted fan architectures, due to not impacting the primary source of thrust which is, in this case, the unducted fan stream. Heat exchangers may cool fluids such as gearbox oil, engine sump oil, thermal transport fluids such as supercritical fluids or commercially available single-phase or two-phase fluids (supercritical CO2, EGV, Slither 800, liquid metals, etc.), engine bleed air, etc. Heat exchangers may also be made up of different segments or passages that cool different working fluids, such as an ACOC paired with a fuel cooler. Heat exchangers 168 may be incorporated into a thermal management system which provides for thermal transport via a heat exchange fluid flowing through a network to remove heat from a source and transport it to a heat exchanger.

Since the fan pressure ratio is higher for the ducted fan than for the unducted fan, the fan duct provides an environment where more compact heat exchangers may be utilized than would be possible if installed on the outside of the core cowl in the unducted fan stream. Fan bypass air is at a very low fan pressure ratio (FPR) (1.05 to 1.08), making it difficult to drive air through heat exchangers. Without the availability of a fan duct as described herein, scoops or booster bleed air may be required to provide cooling air to and through heat exchangers. A set of parameters can be developed around heat exchangers in the fan duct, based on heat load, heat exchanger size, ducted fan stream corrected flow, and ducted fan stream temperature.

The fan duct 166 also provides other advantages in terms of reduced nacelle drag, enabling a more aggressive nacelle close-out, improved core stream particle separation, and inclement weather operation. By exhausting the fan duct flow over the core cowl, this aids in energizing the boundary layer and enabling the option of a steeper nacelle close out angle between the maximum dimension of the core cowl 172 and the exhaust 156. The close-out angle is normally limited by air flow separation, but boundary layer energization by air from the fan duct 166 exhausting over the core cowl reduces air flow separation. This yields a shorter, lighter structure with less frictional surface drag.

Figure 3:
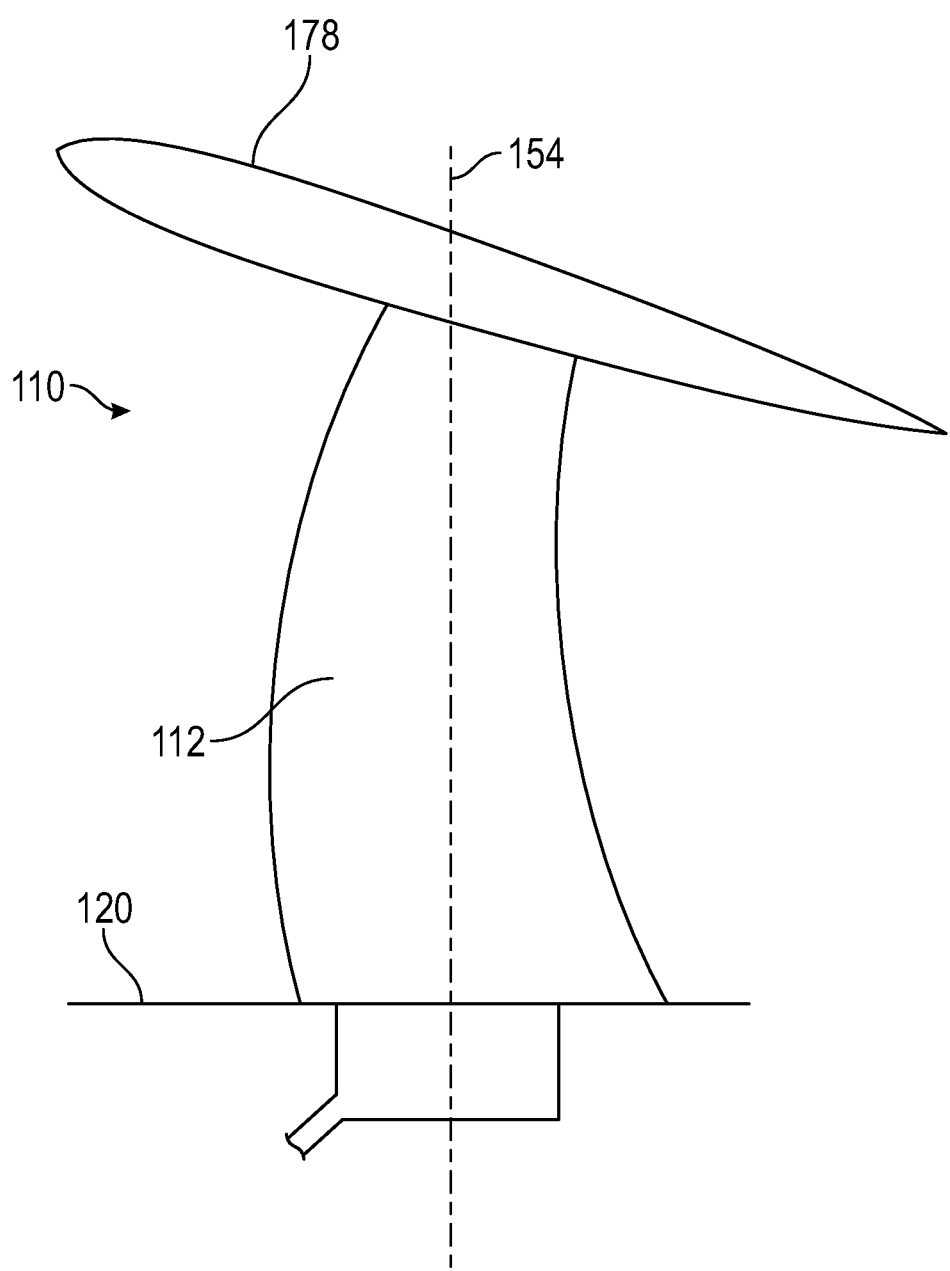
FIG. 3 is an illustration of an alternative embodiment of an exemplary vane assembly for an open rotor propulsion system.
Figure 12:
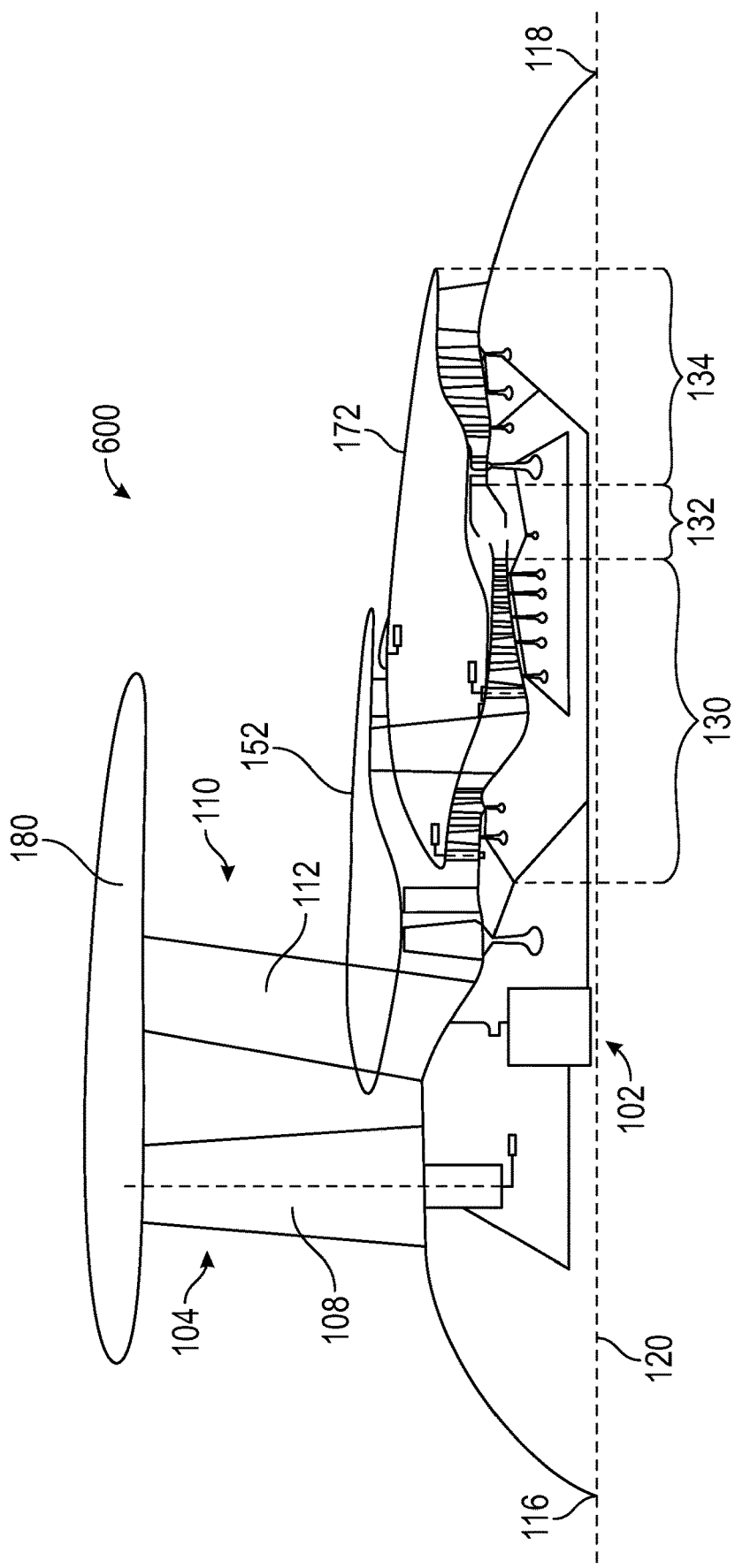
FIG. 12 is a cross-sectional schematic illustration of an exemplary embodiment of a ducted propulsion system.

The fan assembly 104 and/or vane assembly can be shrouded or unshrouded (as shown in FIGS. 1 and 2). FIG. 3 illustrates an optional annular shroud or duct 178 on vane assembly 110 located distally from axis 120. In addition to the noise reduction benefit, the duct 178 shown in FIG. 3 may provide improved vibratory response and structural integrity of stationary vanes 112 by coupling them into an assembly forming an annular ring or one or more circumferential sectors, i.e., segments forming portions of an annular ring linking two or more vanes 112. The duct 178 may also allow the pitch of the vanes to be varied more easily. FIG. 12, discussed in more detail below, discloses another embodiment in which both the fan assembly and vane assembly are shrouded.

Embodiments of the gear assembly 102 depicted and described herein may provide for gear ratios and arrangements that fit within the $L/D_{max}$ constraints of the engine 10. In certain embodiments, the gear assemblies depicted and described in regard to FIGS. 4-11 allow for gear ratios and arrangements providing for rotational speed of the fan assembly corresponding to one or more ranges of cruise altitude and/or cruise speed provided above.

Various embodiments of the gear assembly 102 provided herein may allow for gear ratios of up to 14:1. Still various embodiments of the gear assembly 102 provided herein may allow for gear ratios of at least 6:1. Still yet various embodiments of the gear assembly 102 provided herein allow for gear ratios between 6:1 to 12:1 for a single-stage epicyclic gear assembly. It should be appreciated that embodiments of the gear assembly 102 provided herein may allow for large gear ratios and within constraints such as, but not limited to, length (L) of the engine 10, maximum diameter ($D_{max}$) of the engine 100, cruise altitude of up to 65,000 ft, and/or operating cruise speed of up to Mach 0.85, or combinations thereof.

Various exemplary gear assemblies are shown and described herein. These gear assemblies may be utilized with any of the exemplary engines and/or any other suitable engine for which such gear assemblies may be desirable. In such a manner, it will be appreciated that the gear assemblies disclosed herein may generally be operable with an engine having a rotating element with a plurality of rotor blades and a turbomachine having a turbine and a shaft rotatable with the turbine. With such an engine, the rotating element (e.g., fan assembly 104) may be driven by the shaft (e.g., low-speed shaft 146) of the turbomachine through the gear assembly.

Figure 4:
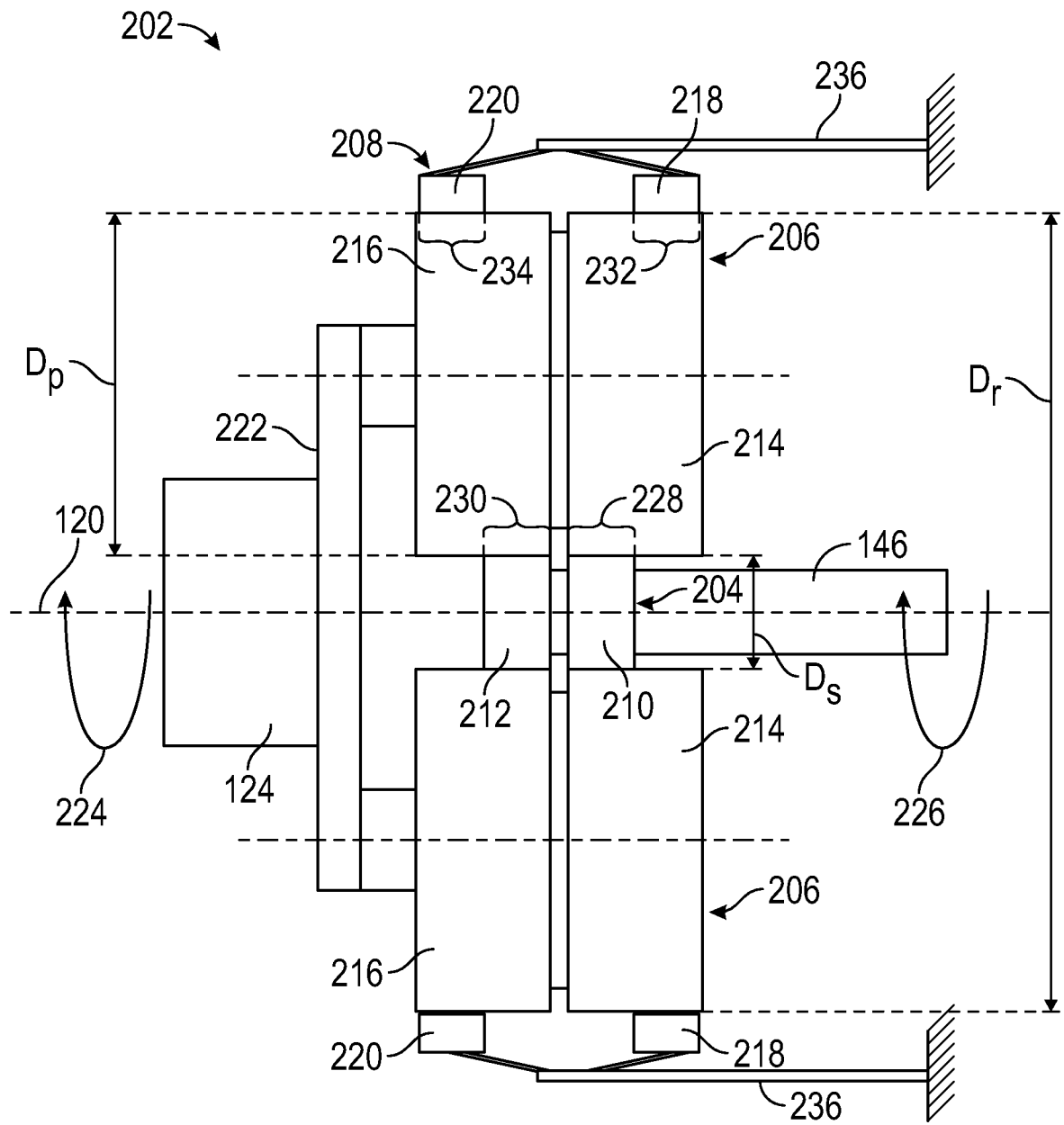
FIG. 4 is a schematic illustration of an exemplary gear assembly with axial offset gear mesh regions.

FIG. 4 illustrates an exemplary gear assembly 202 with axially offset face widths. Gear assembly 202 includes a sun gear 204 with a diameter $D_s$, a plurality of planet gears 206 with a diameter $D_p$, and a ring gear 208 with a diameter $D_r$. Each of the sun gear 204, planet gears 206, and ring gear 208 are double helical gears with first and second sets of helical teeth that are inclined at an acute angle relative to each other. In particular, sun gear 204 comprises a first sun gear set 210 and a second sun gear set 212. Each planet gear 206 comprises a first planet gear set 214 and second planet gear set 216. The ring gear 208 comprises a first ring gear set 218 and a second ring gear set 220.

As discussed in more detail below, the number of planet gears can vary. In one embodiment, there are three planet gears 206. In another embodiment, there are two planet gears 206.

In the embodiment shown in FIG. 4, the gear assembly 202 is a planetary gear configuration in which the ring gear 208 is generally fixed (e.g., static) within the engine by support structure 236. The sun gear 204 is driven by an input shaft (i.e., low-speed shaft 146). A planet gear carrier 222 is rotatably coupled to the plurality of planet gears 206, and the planet gear carrier 222 is configured to rotate about the longitudinal centerline 120 in a circumferential direction 224, which in turn drives the power output source 124 (e.g., a fan shaft) that is coupled to and configured to rotate with the planet gear carrier 222 to drive the fan assembly. In this embodiment, the low-speed shaft 146 rotates in a circumferential direction 226 that is the same as the direction 224 in which the fan shaft 124 rotates.

As shown in FIG. 4, sun gear 204 meshes with planet gears 206 at first contact areas (i.e., sun gear-mesh regions) 228, 230, and ring gear 208 meshes with planet gears 206 at second contact areas 232, 234 (i.e., ring gear-mesh regions). The first contact areas 228, 230 are axially offset from first contact areas 232, 234 so that the gear teeth of the sun gear are not axially aligned, relative to the longitudinal axis 120, with the gear teeth of the ring gear.

Referring again to FIG. 4, the first ring gear set 218 and the second ring gear set 220 are axially spaced apart from one another, and the first sun gear set 210 and the second sun gear set 212 are positioned between the first ring gear set 218 and the second ring gear set 220. As discussed in more detail below, the first contact areas can be non-overlapping with the second contact areas or there can be a relatively small amount of overlap. Thus, in this embodiment the ring gear 208 meshes with the planet gears 206 with an outward offset and the sun gear 204 meshes with the planet gears 206 with an inward offset.

Sun and ring gears can be axially offset such that at least 50% of a width of the sun gear-mesh region does not axially overlap with the ring gear-mesh region. In other embodiments, the axial offset can be such that at least 25% of the width of the sun gear-mesh region does not axially overlap with the ring gear-mesh region. The axial offset of the first and second contact areas described herein can reduce and/or eliminate, depending on the amount of offset, reverse bending of the planet teeth. That is, because of the axial offsets described herein, some or all of the planet teeth do not mesh alternatively with the sun gear and ring gear, which subjects the teeth to reverse bending stresses due to the load reversal. The axial offset provided by this arrangement can provide gear assemblies that are capable of higher gear ratios relative to conventional single-stage epicyclic gear assemblies that are designed to address reverse bending limitations.

By reducing and or eliminating reverse bending stresses on some or all of the teeth of the planet gear, the face width of the teeth of the sun gear can be reduced, which in turn allows for a reduction in the diameter of the sun gear. Because gear ratio is related to the relative diameters of the ring gear and the sun gear, reducing the diameter of the sun gear while maintaining the diameter of the ring gear results in a corresponding increase in gear ratio.

In some embodiments, the axial offset described herein can provide about a 0.6 to 0.8 reduction in the diameter of the sun gear while maintaining the same diameter ring gear. Thus, for example, for a gear assembly having a planetary gear configuration with three planet gears, a 0.7 reduction in the sun gear diameter can increase a gear ratio of 6:1 to 8.2:1, or increase a gear ratio of 6.5:1 to 8.8:1. This allows for single-stage gear assemblies having a planetary gear configuration to achieve gear ratios of greater than or equal to 6:1 and, in some embodiments, gear ratios greater than or equal to 6.6:1, greater than or equal to 7:1, or greater than or equal to 8:1. In other embodiments, the gear assemblies noted above can have an upper range of 14:1, or in some cases 12:1.

Figure 5:
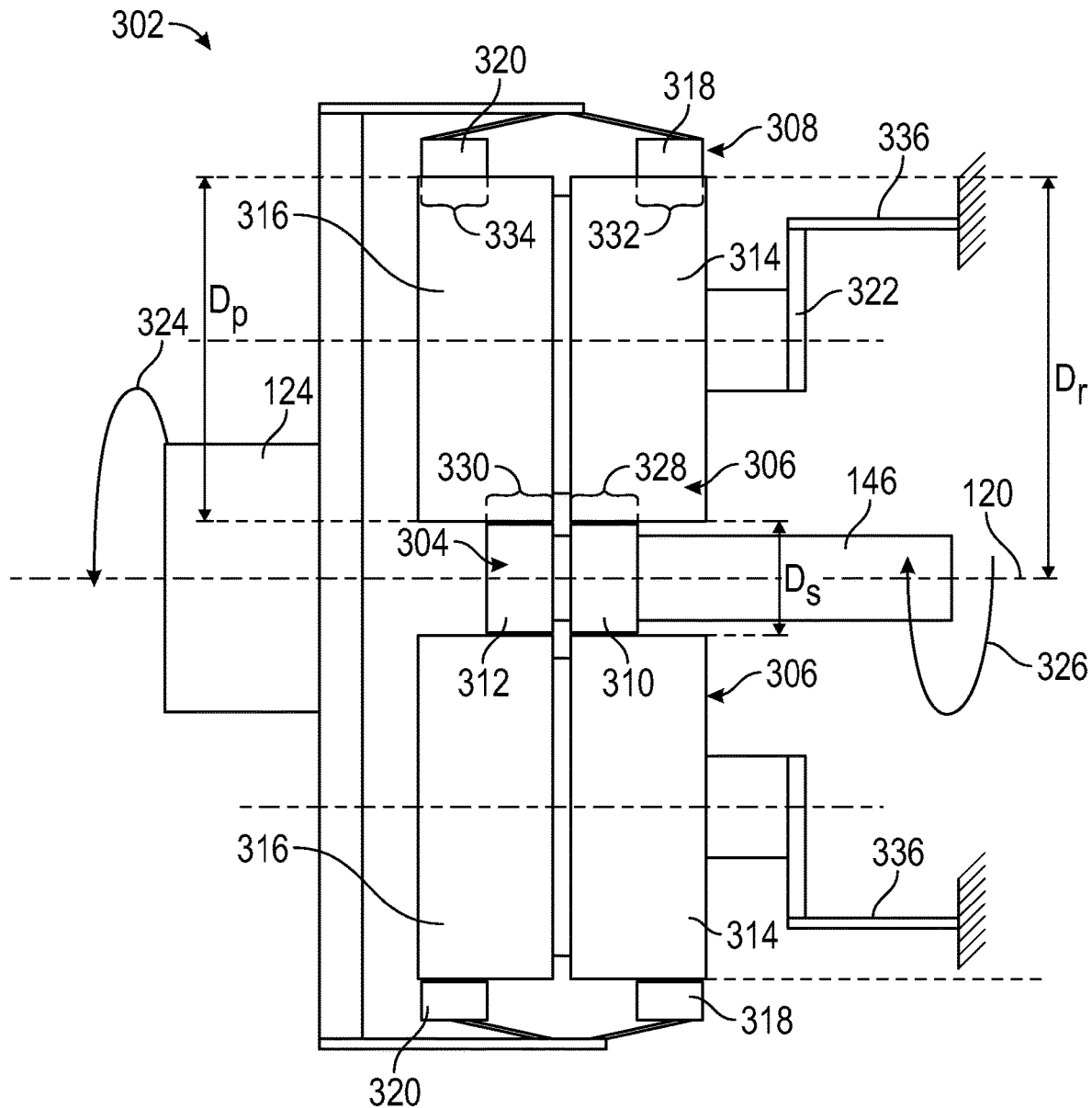
FIG. 5 is a schematic illustration of an exemplary gear assembly with axial offset gear mesh regions.

FIG. 5 illustrates an exemplary gear assembly 302 with axially offset face widths. Gear assembly 302 includes a sun gear 304 with a diameter $D_s$, a plurality of planet gears 306 with a diameter $D_p$, and a ring gear 308 with a diameter $D_r$. Each of the sun gear 304, planet gears 306, and ring gear 308 is a double helical gear with first and second sets of helical teeth that are inclined at an acute angel relative to each other.

The double helical sun gear 304 comprises a first sun gear set 310 and a second sun gear set 312. Each double helical planet gear 306 comprises a first planet gear set 314 and second planet gear set 316. The double helical ring gear 308 comprises a first ring gear set 318 and a second ring gear set 320. In some embodiments, there are two or three planet gears in the gear assembly.

In the embodiment shown in FIG. 5, the gear assembly has a star gear configuration in which the planet carrier 322 is fixed (e.g., static) within the engine by support structure 336. The sun gear 304 is driven by an input shaft (i.e., low-speed shaft 146). The ring gear 308 is configured to rotate in direction 324, opposite that of the low-speed shaft 146 rotation direction 326, to drive the power output source 124 (e.g., a fan shaft) and fan assembly 104.

In a similar manner to that shown FIG. 4, sun gear 304 meshes with planet gears 306 at first contact areas 328, 330, and ring gear 308 meshes with planet gears 306 at second contact areas 332, 334, and the first contact areas 328, 330 are axially offset from second contact areas 332, 334. As discussed above, an axial offset provided by this arrangement can provide gear assemblies that are capable of higher gear ratios relative to conventional single-stage epicyclic gear assemblies that are required to address reverse bending stresses.

As discussed above, the axial offset of the first and second contact areas greatly reduces and/or eliminates, depending on the amount of offset, reverse bending of the planet teeth, which in turn allows for a sun gear with a smaller diameter and a gear assembly with a high gear ratio. For example, a 0.7 reduction in the diameter of the sun gear for a gear assembly having a star gear configuration with three planet gears can increase a gear ratio of 5:1 to 7.2:1 and can increase a gear ratio of 5.5:1 to 7.8:1. This allows for single-stage gear assemblies having star gear configurations, like single-stage gear assemblies having planetary gear configurations, to achieve gear ratios of greater than or equal to 6:1 and in some embodiments, greater than or equal to 6.6:1, greater than or equal to 7:1, and in some embodiments, greater than or equal to 8:1. In other embodiments, the gear assemblies noted above can have an upper range of 14:1, or in some cases 12:1.

FIGS. 6A, 6B, 7A, and 7B are schematic illustrations of exemplary gear assemblies of the type shown in FIGS. 4 and 5. Some of the structures of the gear assemblies shown in FIGS. 6A-7B (e.g., planet carriers, supporting structures) have been omitted for clarity. Although it should be understood that the gear assemblies shown in FIGS. 6A and 6B can be used with either a planetary gear configuration (FIG.

4) or star gear configuration (FIG. 5), for convenience FIGS. 6A-7B use the same numbering as provided in FIG. 4 for the planetary gear configuration.

Figure 7B:
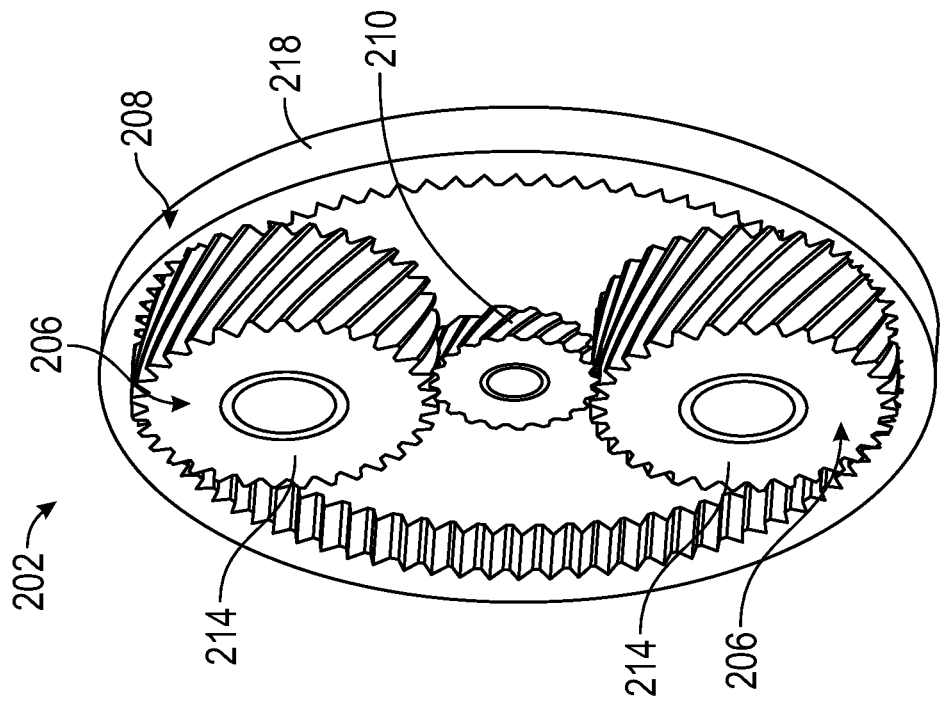
FIGS. 7A and 7B are a schematic illustration of a gear assembly with two planet gears.
Figure 7A:
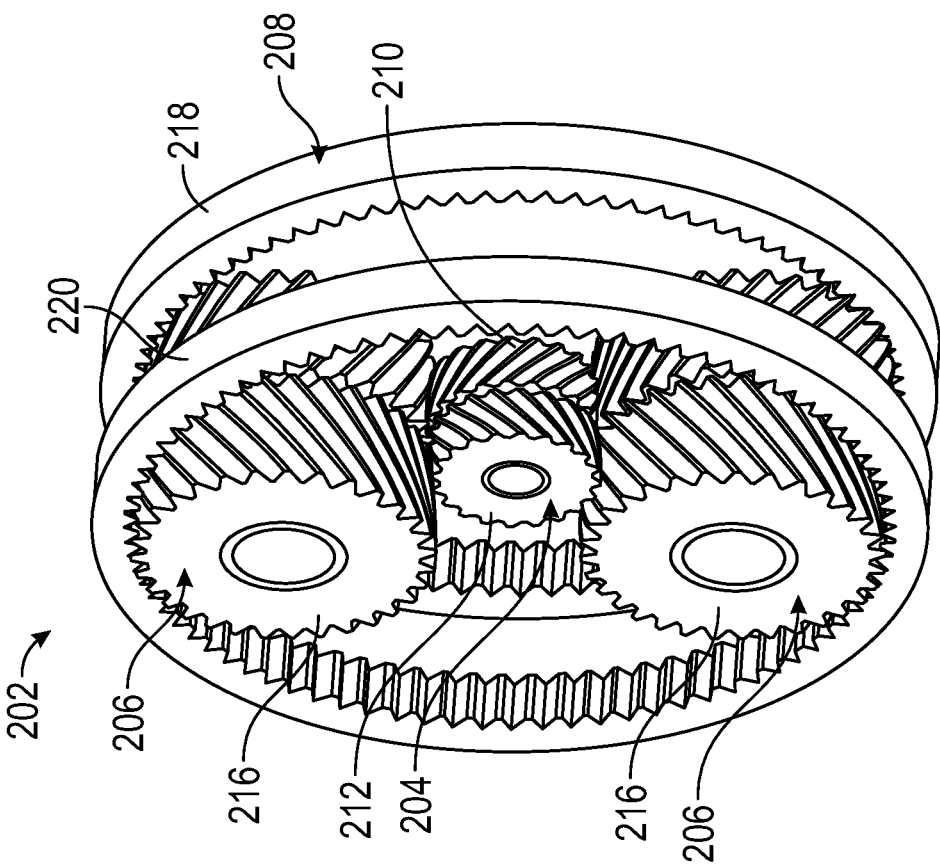

FIGS. 6A and 6B illustrate a gear assembly with three planet gears 206, while FIGS. 7A and 7B illustrate a gear assembly with two planet gears 206. FIG. 6B and FIG. 7B shows the gear assembly of FIG. 6A and FIG. 7A, respectively, with one of the gear sets of the double helical gears removed for clarity. As shown these figures, the contact areas in which the sun and planet gears mate are axially offset from the contact areas at which the ring and planet gears mate to avoid and/or reduce the impact of reverse bending stresses on the teeth of the planet gears.

Figure 8:
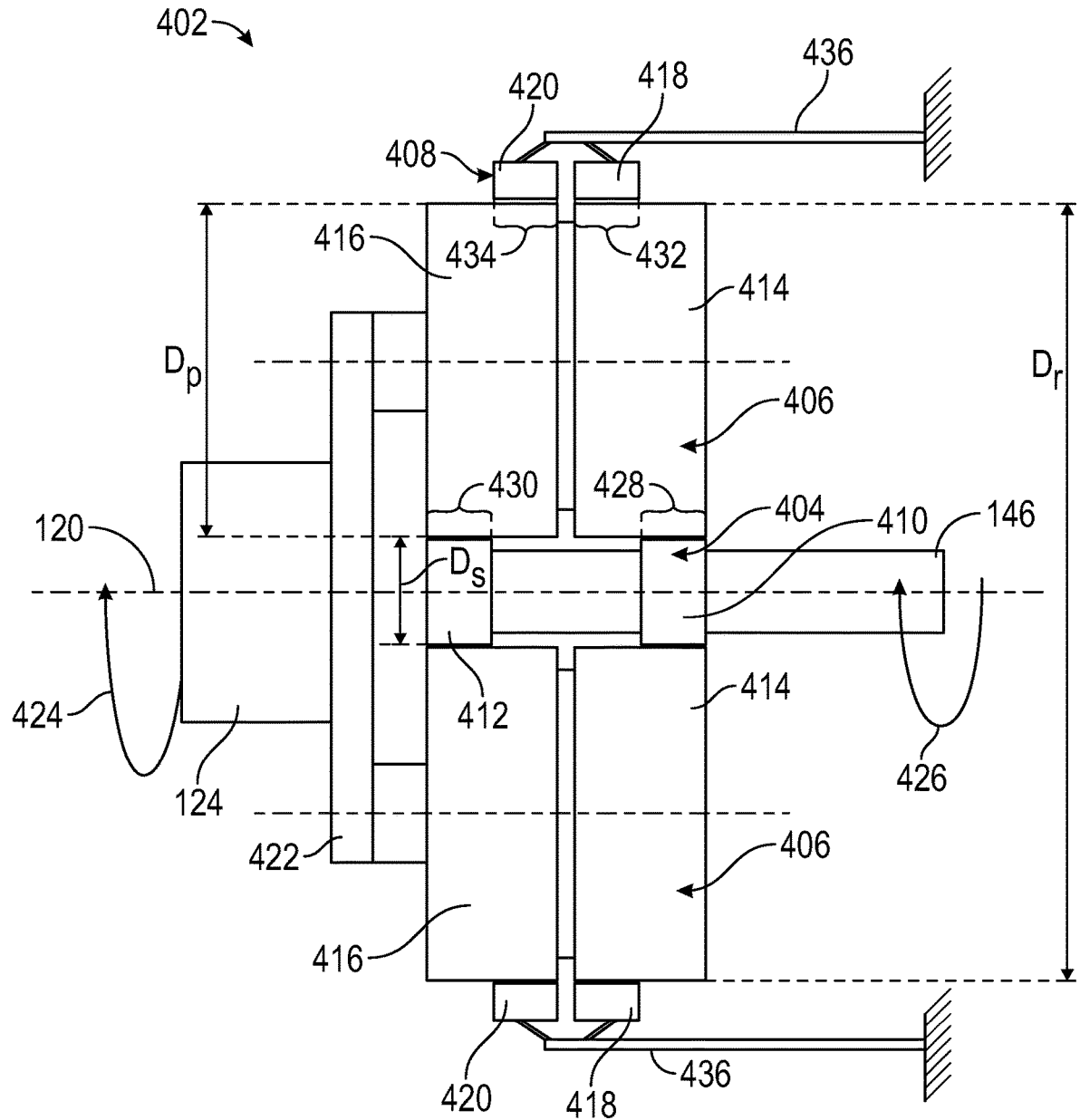
FIG. 8 is a schematic illustration of an exemplary gear assembly with axial offset gear mesh regions.

FIG. 8 illustrates another exemplary gear assembly 402 with axially offset face widths. FIG. 8 has a planet gear configuration and is similar to gear assembly 202 shown in FIG. 4; however, in this embodiment the ring gear meshes with the planet gears with an inward offset and the sun gear meshes with the planet gears with an outward offset.

Referring to FIG. 8, the gear assembly 402 includes a sun gear 404 with a diameter $D_S$, a plurality of planet gears 406 with a diameter $D_p$, and a ring gear 408 with a diameter $D_r$. Each of the sun gear 404, planet gears 406, and ring gear 408 is a double helical gear with first and second sets of helical teeth that are inclined at an acute angel relative to each other. Sun gear 404 comprises a first sun gear set 410 and a second sun gear set 412, planet gears 406 comprise a first planet gear set 414 and second planet gear set 416, and ring gear 408 comprises a first ring gear set 418 and a second ring gear set 420. The number of planet gears can vary as described elsewhere herein.

The embodiment shown in FIG. 8 operates in the same manner as described above with respect to FIG. 4, but with a different axial offset arrangement. As shown in FIG. 8, sun gear 404 meshes with planet gears 406 at first contact areas 428, 430, and ring gear 408 meshes with planet gears 406 at second contact areas 432, 434, and the first contact areas 428, 430 are axially offset from second contact areas 432, 434. The axial offset provided by this arrangement can provide gear assemblies that are capable of higher gear ratios.

As in the embodiment of FIG. 4, the axial offset of the first and second contact areas described herein greatly reduces and/or eliminates, depending on the amount of offset, reverse bending of the planet teeth, and, provide reductions in sun gear diameters and increases in gear ratio, as discussed above, relative to conventional single-stage gear assemblies.

Figure 9:
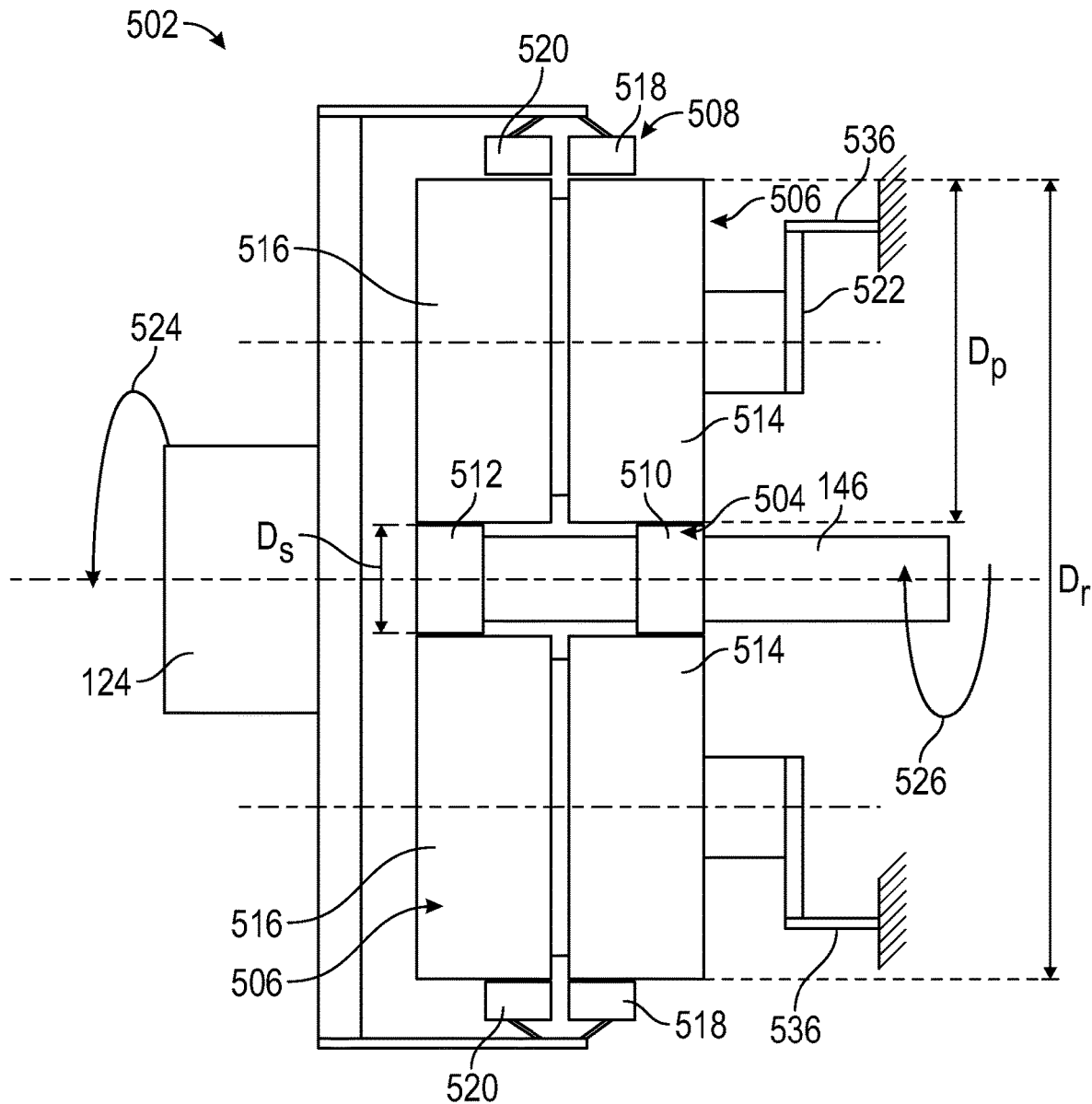
FIG. 9 is a schematic illustration of an exemplary gear assembly with axial offset gear mesh regions.

FIG. 9 illustrates an exemplary gear assembly 502 with axially offset face widths. FIG. 9 is a star gear configuration that is similar to gear assembly 302 shown in FIG. 5; however, in this embodiment the ring gear meshes with the planet gears with an inward offset and the sun gear meshes with the planet gears with an outward offset.

Gear assembly 502 includes a sun gear 504 with a diameter $D_S$, a plurality of planet gears 506 with a diameter $D_p$, and a ring gear 508 with a diameter $D_r$. Each of the sun gear 504, planet gears 506, and ring gear 508 are double helical gears with first and second sets of helical teeth that are inclined at an acute angel relative to each other. In particular, sun gear 504 comprises a first sun gear set 510 and a second sun gear set 512. Each planet gear 506 comprises a first planet gear set 514 and second planet gear set 516. The ring gear 508 comprises a first ring gear set 518 and a second ring gear set 520. The number of planet gears can be two or three.

In this embodiment, like that shown in FIG. 5, the gear assembly has a star gear configuration in which the planet carrier 522 is fixed (e.g., static) within the engine by support structure 536. The sun gear 504 is driven by an input shaft (i.e., low-speed shaft 146). The ring gear 508 is configured to rotate in the direction 524, opposite that of the low-speed shaft 146 rotation direction 526 to drive the power output source 124 (e.g., a fan shaft) to drive the fan assembly.

In a similar manner to that shown FIG. 5, sun gear 504 meshes with planet gears 506 at first contact areas 528, 530, and ring gear 508 meshes with planet gears 506 at second contact areas 532, 534, and the first contact areas 528, 530 are axially offset from second contact areas 532, 534 to provide gear assemblies that are capable of higher gear ratios by reducing and/or eliminating reverse bending stresses on the teeth of the planet gears.

Figure 10:
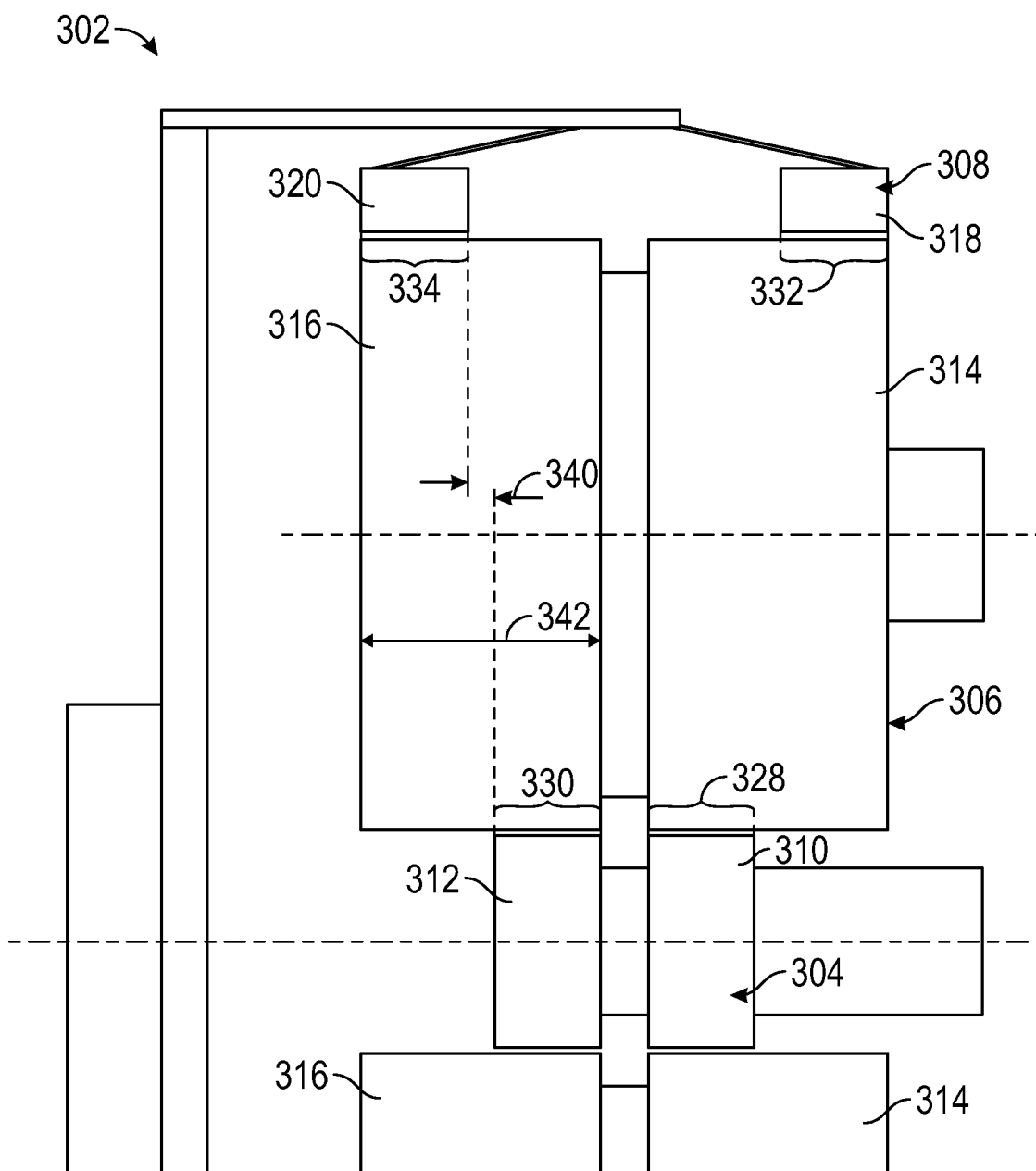
FIG. 10 is a schematic illustration of an exemplary gear assembly with axial offset gear mesh regions without overlap.

FIG. 10 provides an enlarged view of a portion of FIG. 5. As shown in FIG. 10, the first contact area 330 of gear assembly 302 is axially spaced from the second contact area 334 so that there is no overlap between the first and second contact areas. An axial gap 340 is provided between the first and second contact areas 330, 334. A similar gap is provided between the other contact areas (i.e., first and second contact areas 328, 332). Gap 340 can be less than 25%, less than 20%, or less than 15% of a width 342 of the respective planet gear set (e.g., planet gear set 316). In some embodiments, gap 340 between the first and second contact areas can be less than 10%, less than 5%, or less than 2% of the width 342 of the respective planet gear set.

In non-overlapping embodiments, a width of a planet gear set can be greater than the combined width of the respective sun and ring gear sets that mesh with the planet gear set. Thus, for example, the combined width of the first contact area 330 (i.e., a width of the second sun gear set 312) and the second contact area 334 (i.e., a width of the second ring gear set 320) is less than the width of the planet gear 342.

In other embodiments, the contact areas of a respective ring gear set and sun gear set may overlap. For example, FIG. 11 illustrates an enlarged view of a portion of a gear assembly similar to that shown in FIG. 5 but with overlapping contact areas.

Figure 11:
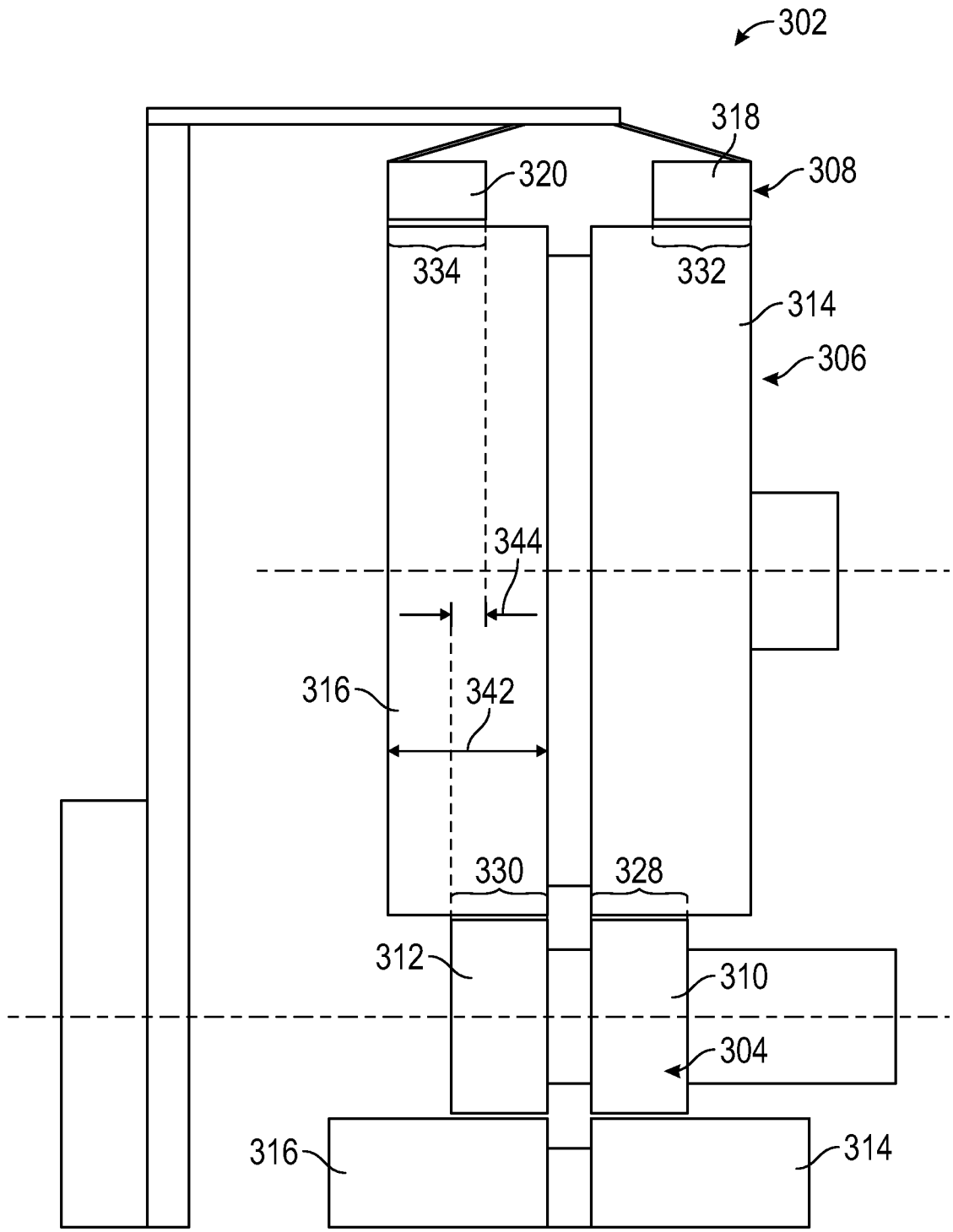
FIG. 11 is a schematic illustration of an exemplary gear assembly with axial offset gear mesh regions with overlap.

Referring to FIG. 11, the first contact area 330 of gear assembly 302 is axially spaced from the second contact area 334; however, there is a relatively small amount of overlap 344 between first and second contact areas 330, 334. A similar overlapping region can be provided with the other contact areas (i.e., first and second contact areas 328, 332). The amount of overlap between the first and second contact areas (e.g., 330, 334) is preferably less than 15% of a width 342 of a respective planet gear set (e.g., planet gear set 316). More preferably, an amount of overlap 344 between the first and second contact areas is less than 10%, less than 5%, or less than 2% of the width 342 of the respective planet gear set.

In overlapping embodiments, a width of a planet gear set can be less than the combined width of the respective sun and ring gear sets that mesh with the planet gear set. Thus, for example, in FIG. 11, the combined width of the first contact area 330 (i.e., a width of the second sun gear set 312) and the second contact area 334 (i.e., a width of the second ring gear set 320) is greater than a width of the planet gear 342.

Although depicted above as an unshrouded or open rotor engine in the embodiments depicted above, it should be appreciated that aspects of the disclosure provided herein may be applied to shrouded or ducted engines, partially ducted engines, aft-fan engines, or other turbomachine configurations, including those for marine, industrial, or aeropropulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter ($D_{max}$) of the engine, $L/D_{max}$ of the engine, desired cruise altitude, and/or desired operating cruise speed, or combinations thereof.

For example, FIG. 12 is a cross-sectional schematic illustration of an exemplary embodiment of an engine 600 that includes the gear assembly 102 in combination with a ducted fan propulsion system. However, unlike the open rotor configuration of FIG. 2, the fan assembly 104 and its fan blades 108 are contained within an annular fan case 180 and the vane assembly 110 and the vanes 112 extend radially between the fan cowl 152 and the inner surface of the fan case 180. As discussed above, the gear assemblies disclosed herein can provide for increased gear ratios for a fixed gear envelope (e.g., with the same size ring gear), or alternatively, a smaller diameter ring gear may be used to achieve the same gear ratios.

The gear assemblies shown and described herein can be used with any suitable engine. For example, although FIG. 12 shows an optional ducted fan and optional fan duct (similar to that shown in FIG. 2), it should be understood that such gear assemblies can be used with other turbofan engines (and other open rotor engines) that do not have any such structures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A turbomachine engine comprising a fan assembly comprising a plurality of fan blades, and a core engine comprising a turbine and an input shaft rotatable with the turbine, and a single-stage epicyclic gear assembly that receives the input shaft at a first speed and drives an output shaft coupled to the fan assembly at a second speed, the second speed being slower than the first speed. The gear assembly comprises a sun gear, a plurality of planet gears, and a ring gear, the sun gear rotating about a longitudinal centerline of the gear assembly, a sun gear-mesh region along the longitudinal centerline of the gear assembly where the sun gear is configured to contact the plurality of planet gears, a ring gear-mesh region along the longitudinal centerline of the gear assembly where the ring gear is configured to contact the plurality of planet gears, wherein the sun gear-mesh region is axially offset from the ring gear-mesh region along the longitudinal centerline such that at least 50% of a width of the sun gear-mesh region does not axially overlap with the ring gear-mesh region.

2. The turbomachine engine of any clause herein, wherein the sun gear, the plurality of planet gears, and the ring gear mesh comprise double helical gears, and the sun gear comprises a first sun gear set and a second sun gear set, each of the plurality of planet gears comprise a first planet gear set and a second planet gear set, and the ring gear comprises a first ring gear set and a second ring gear set.

3. The turbomachine engine of any clause herein, wherein the first ring gear set and the second ring gear set are axially spaced apart from one another along the longitudinal centerline, and the first sun gear set and the second sun gear set are positioned between the first ring gear set and the second ring gear set.

4. The turbomachine engine of any clause herein, wherein the first sun gear set and the second sun gear set are axially spaced apart from one another along the longitudinal centerline, and the first ring gear set and the second ring gear set are positioned between the first sun gear set and the second sun gear set.

5. The turbomachine engine of any clause herein, wherein the sun gear-mesh region comprises a first sun gear-mesh region where the first sun gear set meshes with the first planet gear sets and a second sun gear-mesh region where the second sun gear set meshes with the second planet gear sets, and the ring gear-mesh region comprises a first ring gear-mesh region where the first ring gear set meshes with the first planet gear sets and a second ring gear-mesh region where the second ring gear set meshes with the second planet gear sets.

6. The turbomachine engine of any clause herein, wherein the first sun gear-mesh region and the first ring gear-mesh region do not axially overlap along the longitudinal centerline.

7. The turbomachine engine of any clause herein, wherein there is an axial gap between the first sun gear-mesh region and the first ring gear-mesh region.

8. The turbomachine engine of any clause herein, wherein the axial gap has a gap width that is less than 15% of a width of the first planet gear sets, less than 10% of the width of the first planet gear sets, less than 5% of the width of the first planet gear sets, or less than 2% of the width of the first planet gear sets.

9. The turbomachine engine of any clause herein, wherein there is an axial overlap between the first sun gear-mesh region and the first ring gear-mesh region, and an amount of the axial overlap is less than 15% of a width of the first planet gear sets, less than 10% of the width of the first planet gear sets, less than 5% of the width of the first planet gear sets, or less than 2% of the width of the first planet gear sets.

10. The turbomachine of any clause herein, wherein the gear ratio of the gear assembly ranges from 6:1 to 14:1, from 6.6 to 12:1, from 7:1 to 12:1, or from 8:1 to 12:1.

11. The turbomachine of any clause herein, wherein the gear assembly is a planetary gear configuration in which the ring gear is fixed relative to the engine and does not rotate.

12. The turbomachine of any clause herein, wherein the gear assembly is a star gear configuration in which the planet gears are fixed relative to the engine and do not rotate.

13. The turbomachine of any clause herein, wherein the fan assembly is a single stage of unducted fan blades.

14. The turbomachine of any clause herein, wherein a width of the first planet gear set is greater than a combined width of the first sun gear set and the first ring gear set.

15. The turbomachine of any clause herein, wherein a width of the first planet gear set is less than a combined width of the first sun gear set and the first ring gear set.

16. The turbomachine of any clause herein, wherein the fan assembly has ten to sixteen blades, or ten to fourteen blades, or twelve blades.

17. The turbomachine of any clause herein, wherein a fan blade tip speed at a cruise flight condition is 650 to 900 fps, or 700 to 800 fps.

18. The turbomachine of any clause herein, wherein the fan assembly has a fan pressure ratio (FPR) for the fan assembly 104 can be 1.04 to 1.10, or in some embodiments 1.05 to 1.08, as measured across the fan blades at a cruise flight condition.

19. A gear assembly configured to drive the input shaft at a first speed and drive an output shaft at a second speed that is slower than the first speed, comprising a sun gear, a plurality of planet gears, and a ring gear, the sun gear rotating about a longitudinal centerline of the gear assembly, a sun gear-mesh region along the longitudinal centerline of the gear assembly where the sun gear is configured to contact the plurality of planet gears, a ring gear-mesh region along the longitudinal centerline of the gear assembly where the ring gear is configured to contact the plurality of planet gears, wherein the sun gear-mesh region is axially offset from the ring gear-mesh region along the longitudinal centerline such that at least 50% of a width of the sun gear-mesh region does not axially overlap with the ring gear-mesh region.

20. The gear assembly of any clause herein, wherein the sun gear, the plurality of planet gears, and the ring gear mesh comprise double helical gears, and the sun gear comprises a first sun gear set and a second sun gear set, each of the plurality of planet gears comprise a first planet gear set and a second planet gear set, and the ring gear comprises a first ring gear set and a second ring gear set.

21. The gear assembly of any clause herein, wherein the first ring gear set and the second ring gear set are axially spaced apart from one another along the longitudinal centerline, and the first sun gear set and the second sun gear set are positioned between the first ring gear set and the second ring gear set.

22. The gear assembly of any clause herein, wherein the first sun gear set and the second sun gear set are axially spaced apart from one another along the longitudinal centerline, and the first ring gear set and the second ring gear set are positioned between the first sun gear set and the second sun gear set.

23. The gear assembly of any clause herein, wherein the sun gear-mesh region comprises a first sun gear-mesh region where the first sun gear set meshes with the first planet gear sets and a second sun gear-mesh region where the second sun gear set meshes with the second planet gear sets, and the ring gear-mesh region comprises a first ring gear-mesh region where the first ring gear set meshes with the first planet gear sets and a second ring gear-mesh region where the second ring gear set meshes with the second planet gear sets.

24. The gear assembly of any clause herein, wherein the first sun gear-mesh region and the first ring gear-mesh region do not axially overlap along the longitudinal centerline.

25. The gear assembly of any clause herein, wherein there is an axial gap between the first sun gear-mesh region and the first ring gear-mesh region.

26. The gear assembly of any clause herein, wherein the axial gap has a gap width that is less than 15% of a width of the first planet gear sets, less than 10% of the width of the first planet gear sets, less than 5% of the width of the first planet gear sets, or less than 2% of the width of the first planet gear sets.

27. The gear assembly of any clause herein, wherein there is an axial overlap between the first sun gear-mesh region and the first ring gear-mesh region, and an amount of the axial overlap is less than 15% of a width of the first planet gear sets, less than 10% of the width of the first planet gear sets, less than 5% of the width of the first planet gear sets, or less than 2% of the width of the first planet gear sets.

28. The gear assembly of any clause herein, wherein the gear ratio of the gear assembly ranges from 6:1 to 14:1, from 6.6 to 12:1, from 7:1 to 12:1, or from 8:1 to 12:1.

29. The gear assembly of any clause herein, wherein the gear assembly is a planetary gear configuration or a star gear configuration.

30. The turbomachine of any clause herein, wherein a width of the first planet gear set is greater than a combined width of the first sun gear set and the first ring gear set, or wherein a width of the first planet gear set is less than a combined width of the first sun gear set and the first ring gear set.

We claim:

1. A turbomachine engine comprising:
a fan assembly comprising a plurality of fan blades;
a core engine comprising a turbine and an input shaft rotatable with the turbine; and
a single-stage epicyclic gear assembly that receives the input shaft at a first speed and drives an output shaft coupled to the fan assembly at a second speed, the second speed being slower than the first speed, the gear assembly comprising:
a sun gear, a plurality of planet gears, and a ring gear, the sun gear rotating about a longitudinal centerline of the gear assembly;
a sun gear-mesh region along the longitudinal centerline of the gear assembly where the sun gear is configured to contact the plurality of planet gears;
a ring gear-mesh region along the longitudinal centerline of the gear assembly where the ring gear is configured to contact the plurality of planet gears,
wherein the sun gear-mesh region is axially offset from the ring gear-mesh region along the longitudinal centerline such that at least 50% of a width of the sun gear-mesh region does not axially overlap with the ring gear-mesh region,
wherein the sun gear, the plurality of planet gears, and the ring gear comprise double helical gears, and the sun gear comprises a first sun gear set and a second sun gear set, each of the plurality of planet gears comprise a first planet gear set and a second planet gear set, and the ring gear comprises a first ring gear set and a second ring gear set,
wherein the first ring gear set and the second ring gear set are axially spaced apart from one another along the longitudinal centerline, and the first sun gear set and the second sun gear set are positioned between the first ring gear set and the second ring gear set,
wherein the sun gear-mesh region comprises a first sun gear-mesh region where the first sun gear set meshes with the first planet gear sets and a second sun gear-mesh region where the second sun gear set meshes with the second planet gear sets,
the ring gear-mesh region comprises a first ring gear-mesh region where the first ring gear set meshes with the first planet gear sets and a second ring gear-mesh region where the second ring gear set meshes with the second planet gear sets, and
wherein a width of the first planet gear set is less than a combined width of the first sun gear set and the first ring gear set.

2. The turbomachine engine of claim 1, wherein the first sun gear-mesh region and the first ring gear-mesh region do not axially overlap along the longitudinal centerline.

3. The turbomachine engine of claim 1, wherein there is an axial gap between the first sun gear-mesh region and the first ring gear-mesh region.

4. The turbomachine engine of claim 3, wherein the axial gap has a gap width that is less than 15% of a width of the first planet gear sets.

5. The turbomachine engine of claim 1, wherein there is an axial overlap between the first sun gear-mesh region and the first ring gear-mesh region, and an amount of the axial overlap is less than 15% of a width of the first planet gear sets.

6. The turbomachine engine of claim 1, wherein a gear ratio of the gear assembly is within a range that extends from 6:1 to 14:1.

7. The turbomachine engine of claim 1, wherein the gear assembly is a planetary gear configuration in which the ring gear is fixed relative to the engine and does not rotate.

8. The turbomachine engine of claim 1, wherein the gear assembly is a star gear configuration in which the planet gears are fixed relative to the engine and do not rotate.

9. The turbomachine engine of claim 1, wherein the fan assembly is a single stage of unducted fan blades.

10. The turbomachine engine of claim 1, wherein a width of the first planet gear set is greater than a combined width of the first sun gear set and the first ring gear set.

11. The turbomachine engine of claim 1, wherein the fan assembly has ten to sixteen blades, or ten to fourteen blades, or twelve blades.

12. The turbomachine engine of claim 1, wherein a fan blade tip speed at a cruise flight condition is 650 to 900 fps.

13. The turbomachine engine of claim 1, wherein the fan assembly has a fan pressure ratio (FPR) for the fan assembly that is 1.04 to 1.10, as measured across the fan blades at a cruise flight condition.

14. A turbomachine engine comprising:
a fan assembly comprising a plurality of fan blades;
a core engine comprising a turbine and an input shaft rotatable with the turbine; and
a gear assembly configured to drive an input shaft at a first speed and drive an output shaft at a second speed that is slower than the first speed, the gear assembly comprising:
a sun gear rotating about a longitudinal centerline of the gear assembly;
a plurality of planet gears;
a ring gear;
a sun gear-mesh region along the longitudinal centerline of the gear assembly where the sun gear is configured to contact the plurality of planet gears;
a ring gear-mesh region along the longitudinal centerline of the gear assembly where the ring gear is configured to contact the plurality of planet gears,
wherein the sun gear-mesh region is axially offset from the ring gear-mesh region along the longitudinal centerline such that at least 50% of a width of the sun gear-mesh region does not axially overlap with the ring gear-mesh region,
wherein the sun gear, the plurality of planet gears, and the ring gear mesh comprise double helical gears, and the sun gear comprises a first sun gear set and a second sun gear set, each of the plurality of planet gears comprise a first planet gear set and a second planet gear set, and the ring gear comprises a first ring gear set and a second ring gear set,
wherein the first sun gear set and the second sun gear set are axially spaced apart from one another along the longitudinal centerline, and the first sun gear set and the second sun gear set are positioned between the first ring gear set and the second ring gear set, and
wherein the fan assembly has a fan pressure ratio (FPR) for the fan assembly that is 1.04 to 1.10, as measured across the fan blades at a cruise flight condition.

15. The turbomachine engine of claim 14, wherein the sun gear-mesh region comprises a first sun gear-mesh region where the first sun gear set meshes with the first planet gear sets and a second sun gear-mesh region where the second sun gear set meshes with the second planet gear sets, and the ring gear-mesh region comprises a first ring gear-mesh region where the first ring gear set meshes with the first planet gear sets and a second ring gear-mesh region where the second ring gear set meshes with the second planet gear sets.

16. The turbomachine engine of claim 15, wherein there is an axial gap between the first sun gear-mesh region and the first ring gear-mesh region, and
wherein the axial gap has a gap width that is less than 5% of the width of the first planet gear sets.

17. The turbomachine engine of claim 15, wherein the first sun gear-mesh region and the first ring gear-mesh region do not axially overlap along the longitudinal centerline.

18. The turbomachine engine of claim 15, wherein there is an axial gap between the first sun gear-mesh region and the first ring gear-mesh region, and
wherein the axial gap has a gap width that is less than 15% of a width of the first planet gear sets.

19. The turbomachine engine of claim 14, wherein a gear ratio of the gear assembly is within a range that extends from 6:1 to 14:1.

20. A turbomachine engine comprising:
a fan assembly comprising a plurality of fan blades;
a core engine comprising a turbine and an input shaft rotatable with the turbine; and
a single-stage epicyclic gear assembly that receives the input shaft at a first speed and drives an output shaft coupled to the fan assembly at a second speed, the second speed being slower than the first speed, the gear assembly comprising:
a sun gear, a plurality of planet gears, and a ring gear, the sun gear rotating about a longitudinal centerline of the gear assembly;
a sun gear-mesh region along the longitudinal centerline of the gear assembly where the sun gear is configured to contact the plurality of planet gears;
a ring gear-mesh region along the longitudinal centerline of the gear assembly where the ring gear is configured to contact the plurality of planet gears,
wherein the sun gear-mesh region is axially offset from the ring gear-mesh region along the longitudinal centerline such that at least 50% of a width of the sun gear-mesh region does not axially overlap with the ring gear-mesh region,
wherein the sun gear, the plurality of planet gears, and the ring gear comprise double helical gears, and the sun gear comprises a first sun gear set and a second sun gear set, each of the plurality of planet gears comprise a first planet gear set and a second planet gear set, and the ring gear comprises a first ring gear set and a second ring gear set,
wherein the first ring gear set and the second ring gear set are axially spaced apart from one another along the longitudinal centerline, and the first sun gear set and the second sun gear set are positioned between the first ring gear set and the second ring gear set, wherein the sun gear-mesh region comprises a first sun gear-mesh region where the first sun gear set meshes with the first planet gear sets and a second sun gear-mesh region where the second sun gear set meshes with the second planet gear sets, the ring gear-mesh region comprises a first ring gear-mesh region where the first ring gear set meshes with the first planet gear sets and a second ring gear-mesh region where the second ring gear set meshes with the second planet gear sets, and wherein there is an axial overlap between the first sun gear-mesh region and the first ring gear-mesh region, and an amount of the axial overlap is less than 15% of a width of the first planet gear set.

* * * * *